US009628777B2

(12) United States Patent
Benosman et al.

(10) Patent No.: US 9,628,777 B2
(45) Date of Patent: Apr. 18, 2017

(54) METHOD OF 3D RECONSTRUCTION OF A SCENE CALLING UPON ASYNCHRONOUS SENSORS

(71) Applicants: Ryad Benosman, Paris (FR); Joao Carneiro, Paris (FR); Sio-Hoi Ieng, Paris (FR)

(72) Inventors: Ryad Benosman, Paris (FR); Joao Carneiro, Paris (FR); Sio-Hoi Ieng, Paris (FR)

(73) Assignees: UNIVERSITE PIERRE ET MARIE CURIE (PARIS 6), Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 330 days.

(21) Appl. No.: 14/363,681

(22) PCT Filed: Dec. 10, 2012

(86) PCT No.: PCT/EP2012/074989
§ 371 (c)(1),
(2) Date: Jun. 6, 2014

(87) PCT Pub. No.: WO2013/083848
PCT Pub. Date: Jun. 13, 2013

(65) Prior Publication Data
US 2014/0333730 A1   Nov. 13, 2014

(30) Foreign Application Priority Data
Dec. 8, 2011   (FR) ...................................... 11 61320

(51) Int. Cl.
*H04N 13/02*   (2006.01)
*H04N 7/18*   (2006.01)

(52) U.S. Cl.
CPC ..... *H04N 13/0239* (2013.01); *H04N 13/0242* (2013.01); *H04N 13/0296* (2013.01)

(58) Field of Classification Search
CPC .......... H04N 13/0239; H04N 13/0296; H04N 13/0055; H04N 2013/0081; H04N 13/0242; G06T 7/0022
See application file for complete search history.

(56) References Cited

U.S. PATENT DOCUMENTS

2010/0182468 A1    7/2010 Posch et al.
2010/0278383 A1*  11/2010 Javidi ................ H04N 13/0232
                                                          382/103

(Continued)

FOREIGN PATENT DOCUMENTS

WO    2008/061268 A1    5/2008

OTHER PUBLICATIONS

Patrick Lichtsteiner et al: "A 128128 120 dB 15 s Latency Asynchronous Temporal Contrast Vision Sensor", IEEE Journal of Solid-State Circuits, IEEE Service Center, Piscataway, NJ, USA, vol. 43, No. 2, Feb. 1, 2008 (Feb. 1, 2008), pp. 566-576, XP011200748, ISSN: 0018-9200, DOI: 10.1109/JSSC.2007.914337 abstract.*

(Continued)

*Primary Examiner* — Sath V Perungavoor
*Assistant Examiner* — Howard D Brown, Jr.
(74) *Attorney, Agent, or Firm* — Sughrue Mion, PLLC

(57) ABSTRACT

A method of 3D reconstruction of a scene, including the implementation of at least two sensors each having a series of elementary receivers arranged so as to view the scene according to distinct respective solid angles and which are each sensitive to a physical characteristic of a signal received by the receiver originating from the scene. The sensors are adapted for emitting an asynchronous stream of events indicative of a modification of the signal received by (Continued)

one of the elementary receivers at a given instant, as well as the implementation of a 3D reconstruction algorithm having a step of pairing elementary receivers of each of the sensors utilizing signals generated by the sensors, the pairing including pairing between them events generated by each of the sensors and temporarily close together.

8 Claims, 2 Drawing Sheets

(56) References Cited

U.S. PATENT DOCUMENTS

2013/0187910 A1* 7/2013 Raymond ............... G09G 5/14 345/419
2014/0125775 A1* 5/2014 Holz ................. H04N 13/0217 348/49
2014/0333730 A1* 11/2014 Benosman ......... H04N 13/0239 348/47

OTHER PUBLICATIONS

Benosman R et al: "Asynchronous Event-Based Hebbian Epipolar Geometry", IEEE Transactions on Neural Networks, IEEE Service Center, Piscataway, NJ, US, vol. 22, No. 11, Nov. 1, 2011 (Nov. 1, 2011), pp. 1723-1734, XP011411486, ISSN: 1045-9227, DOI: 10.1109/TNN.2011.2167239.*

Ryad Benosman et al., "Asynchronous Event-Based Hebbian Epipolar Geometry," IEEE Transactions on Neural Networks, Nov. 2011, pp. 1723-1734, vol. 22, No. 11.

Patrick Lichtsteiner et al., "A 128×128 120 dB 15 μs Latency Asynchronous Temporal Contrast Vision Sensor," IEEE Journal of Solid-State Circuits, Feb. 2008, pp. 566-576, vol. 43, No. 2.

International Search Report of PCT/EP2012/074989 dated Jan. 16, 2013.

* cited by examiner

METHOD OF 3D RECONSTRUCTION OF A SCENE CALLING UPON ASYNCHRONOUS SENSORS

CROSS REFERENCE TO RELATED APPLICATIONS

This is a National Stage of International Application No. PCT/EP2012/074989 filed Dec. 10, 2012, claiming priority based on French Patent Application No. 1161320, filed Dec. 8, 2011, the contents of all of which are incorporated herein by reference in their entirety.

The invention relates to a method of 3D reconstruction of a scene calling upon asynchronous sensors.

BACKGROUND OF THE INVENTION

It is known practice to carry out three-dimensional reconstructions on the basis of images taken by at least two synchronized cameras taking images of the same scene. The first stereovision algorithms appeared in the 1970s. Significant progress has been made in recent years. This progress concerns increasingly effective matching algorithms.

The optical sensors used include elementary receivers (for example pixels of a camera) arranged in a matrix to see the scene from separate respective solid angles, and capture images of the scene at regular intervals (generally several images per second). Each image is then represented by a table of values (one per elementary receiver) each representing a physical characteristic of a signal received from the scene by the corresponding elementary sensor, for example a luminous intensity.

More precisely, such optical sensors generate, at each time increment $t_k$, and for each elementary receiver placed at x,y, items of information $f_k(x,y) = \delta(t, t_k) \cdot f(x,y,t)$. where f is the luminous intensity perceived by the receiver placed at x, y, and $\delta$ is Kronecker's symbol. The item of information sent back by such a sensor is then the matrix or frame $I_k = \{f_k(x,y)\}$, $x \in N$, $y \in M$, where N,M are the dimensions of the matrix, this information being sent at each time increment.

Then the matching algorithm searches these items of information for patterns that can be due to one and the same element of the scene and matches the corresponding elementary sensors together. Knowing the position of these elementary receivers thus matched, it is easy to retrieve by triangulation the point of the scene that has been seen by these two elementary receivers, and therefore to incorporate it into the 3D reconstruction of the scene.

Each image can represent a size of several megaoctets, and this at the rate of several images per second (typically 24 images per second), which represents a considerable bandwidth. The 3D reconstruction algorithms then carry out a search for patterns in the images taken by the various sensors at the same instant with the aim of matching together patterns corresponding to one and the same element of the scene. These algorithms require software packages that consume a good deal of power and computing time, which are not envisionable for real-time applications.

SUBJECT OF THE INVENTION

The subject of the invention is a method of 3D reconstruction of a scene allowing implementation in real time with reasonable computing means.

DISCLOSURE OF THE INVENTION

With the aim of achieving this goal, a method of 3D reconstruction of a scene is proposed, including:

the implementation of at least two sensors each including a series of elementary receivers arranged to observe the scene from separate respective solid angles and which are each sensitive to a physical characteristic of a signal received by said receiver originating from the scene;

the implementation of a 3D reconstruction algorithm including a step of matching receivers of each of the sensors employing signals generated by the sensors;

According to the invention, the method includes the use of sensors that are each adapted to emit an asynchronous stream of events that are each indicative of a modification of the signal received by one of the elementary receivers at a given instant, the matching consisting in matching together events generated by each of the sensors by selecting temporally close events.

The use of such sensors makes it possible to spectacularly decrease the output of information from the sensors and considerably simplifies the matching. The matching of temporally close events in fact comes down to matching the receivers on each of the sensors that have generated the events thus matched. The matching is very simple to implement, with modest processing means.

The 3D reconstruction method of the invention can be implemented with reasonable means, for example a simple personal computer equipped with suitable data acquisition cards.

DESCRIPTION OF THE FIGURES

The invention will be better understood in the light of the figures of the appended drawings, among which.

DETAILED DESCRIPTION OF THE INVENTION

Figure 1:
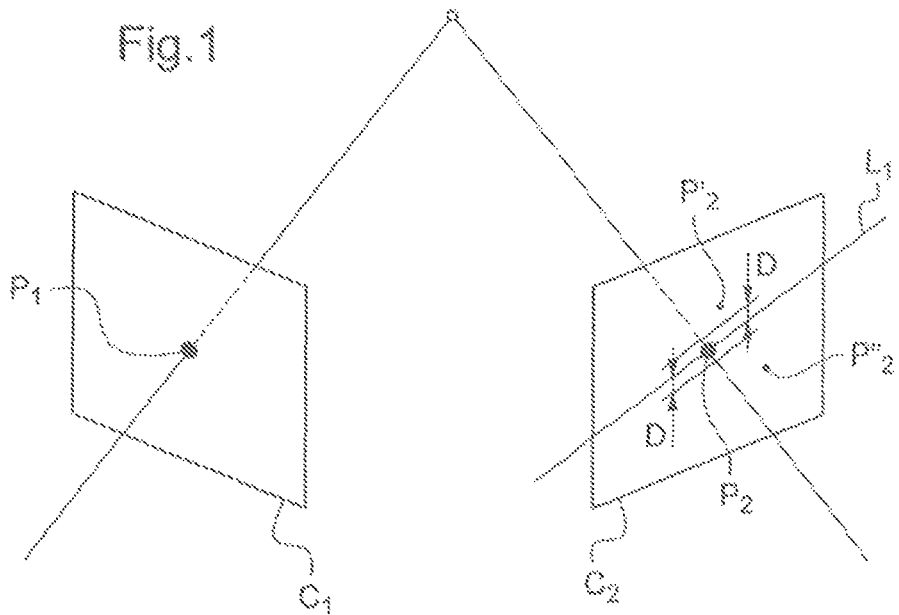
FIG. 1 is a diagram illustrating the focal planes of two asynchronous sensors observing one and the same scene according to the invention.

In the mode of implementation detailed below, with reference to FIG. 1, a scene is filmed using two sensors C1 and C2 each including a CCD or CMOS camera (called right and left respectively). Each camera includes MxN pixels, each comparable to an elementary sensor. Each pixel sees the scene from a given solid angle and is sensitive to the luminous intensity received in this solid angle. FIG. 1 illustrates the focal planes of the two sensors C1 and C2.

However, in the context of the invention, the cameras are not used in a conventional manner. Rather than using the camera to make it generate frames $I_k = \{f_k(x, y)\}, x \in N, y \in M$ at regular intervals, each elementary information item of which represents the luminous intensity received by each pixel at the instant $t_k$, it is a derivative item of information that is of interest here, in this case the direction of variation of the luminous intensity received by each of the pixels. The quantity of interest is thus $$e(x, y, t) = \text{sign} \frac{\partial f}{\partial t}(x, y, t)$$

which can take two values: −1 if the luminous intensity of the signal received by the pixel is decreasing, and 1 if the luminous intensity of the signal received by the pixel is increasing. This quantity is sampled for instants of sampling $t_k$:

$$e_k(x, y) = \delta(t, t_k) \cdot \text{sign}\frac{\partial f}{\partial t}(x, y, t)$$

where δ is Kronecker's symbol.

Thus, this event is indicative of an increase (+1) or of a decrease (−1) in the luminous intensity perceived by the pixel $P_{x,y}$ situated at x,y at time $t_k$.

Such an item of information can for example be generated by post-processing of the information about the received luminous intensity from each of the pixels of the camera, which is embedded on a digital processing card connected to the camera and which is embedded either in the camera itself, or in the computer to which the camera is linked.

The item of matrix information $I_k=\{f_k(x,y)\}$, x∈N, y∈M usually generated by such cameras and employed for 3D reconstruction in known methods is then replaced according to the invention by an item of matrix information $E_k=\{e_k(x,y)\}$, x∈N, y∈M.

Such an item of matrix information clearly consumes less memory space than a conventional image, since each data item of the matrix information item is easily contained in a single octet.

However, rather than transmitting the information items in matrix form, it is possible, according to a particularly advantageous aspect of the invention, to transmit an asynchronous stream of events $E_i$, each event being identified by:
  data enabling the identification of the pixel whose quantity e has changed value, in this case the coordinates x,y of the corresponding pixel $P_{xy}$;
  the instant of the change of value;
  an indicator of the modification of the signal perceived by the pixel, in this case taking the value (−1;1) reached by the quantity e upon this change (hereinafter called value of the event).

This asynchronous stream can be represented by the following notation:

$\{x_1,y_1,t_1,e_1; x_2,y_2,t_2,e_2; x_3,y_3,t_3,e_3; \ldots x_n,y_n,t_n,e_n\}$ where $E_1=[x_1,y_1,t_1,e_1]$ is the first event, and $E_n[x_n,y_n,t_n,e_n]$ is the $n^{th}$ event.

This asynchronous stream is generated here by the electronics card providing the post-processing of the camera data. The items of identification information of each event are of modest memory size and can be sent sequentially. These information items are of course only sent if an event E has actually been generated, which considerably decreases the necessary output. In the absence of an event (for example a fixed scene and a fixed camera), nothing is sent. An asynchronous signal has therefore been created, which can be transmitted by means of a simple series link, but containing enough information to allow a 3D reconstruction of the scene, as will now be detailed.

With this aim, a very simple matching method is implemented according to the invention on the basis of the events generated by the two sensors C1, C2, the cameras of which are filming the same scene. The principle of this matching consists in positing the hypothesis that it is very likely that temporally close events generated by the two cameras relate to one and the same pattern or point of the scene. An attempt will then be made to match two temporally close events generated by the left-hand sensor and the right-hand sensor. In this way a matching will be performed that is spatial as well as temporal.

However, if at a given instant a change of luminous intensity, due for example to a movement in the scene, affects such and such a pixel on both cameras and where applicable generates events for each of the sensors, it is not very likely that the instants of occurrence of these events will coincide exactly with each other. First of all, the cameras show a latency time for reacting and generating the events, which also often varies for each of the pixels. Next, delays can arise in the generation of the information and its transmission. It can thus turn out to be hazardous to match events on the sole basis of an exact temporal coincidence of events generated by both cameras.

Figure 2:
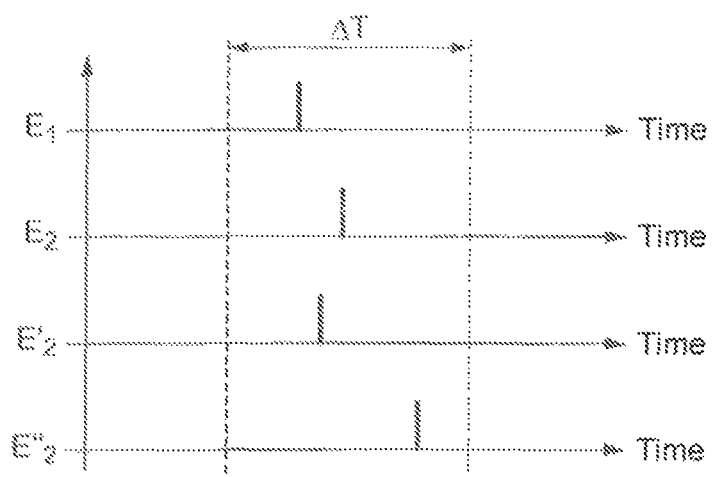
FIG. 2 is a timing diagram of events detected by the sensors in FIG. 1.

It is however possible to select, for each event $E_1$ generated by the left-hand camera (named left-hand event, or source event, and whose corresponding pixel $P_1$ is seen in FIG. 1), a set of events (here the events $E_2, E'_2, E''_2$) generated by the right-hand camera (named right-hand events and whose corresponding pixels $P_2, P'_2, P''2$ can be seen) which have occurred in a given time window ΔT around the instant of occurrence of the left-hand event as is illustrated in FIG. 2. Thus, the right-hand event or events are selected to be temporally close to the source event. Obviously, the smaller the time window, the fewer the right-hand events that the set thus determined will contain.

This preliminary selection makes it possible to retain only a small number of right-hand events, one of which will be matched with the left-hand event. Where applicable, a single right-hand event is selected. The desired matching is then performed. If such is not the case, it is then a question of filtering the right-hand events to retain only the one that corresponds to the left-hand event under consideration. To do this, at least one of the following sifting procedures is applied:
  for each of the selected right-hand events the distance is computed between the corresponding pixel and the epipolar line $L_1$ in the focal plane of the right-hand camera that corresponds to the pixel $P_1$ linked to the left-hand event. Thus, all the right-hand events for which the distance thus determined is above a given limit D are eliminated. Preferably, the distance under consideration is a Euclidian distance;
  all the selected right-hand events not having the same value as that of the left-hand are eliminated. Thus, if the left-hand event corresponds to an increase in luminous intensity, only the right-hand events also corresponding to an increase in luminous intensity will be retained;
  all the selected right-hand events having already been the subject of a matching are eliminated, according to the application of the uniqueness principle.

Preferably, the sifting procedures are applied in the order indicated, until only one right-hand event is retained. These selection and sorting procedures consume very little memory size and computing time, and can therefore be easily implemented in real time with reasonable means, for example a simple personal computer.

The matching of two events therefore makes it possible to determine the matching of the two corresponding pixels as well as the instant when these two pixels must be matched. A conventional triangulation then makes it possible to determine the position of the point of the scene that has been seen by the two pixels thus matched.

Figure 3:
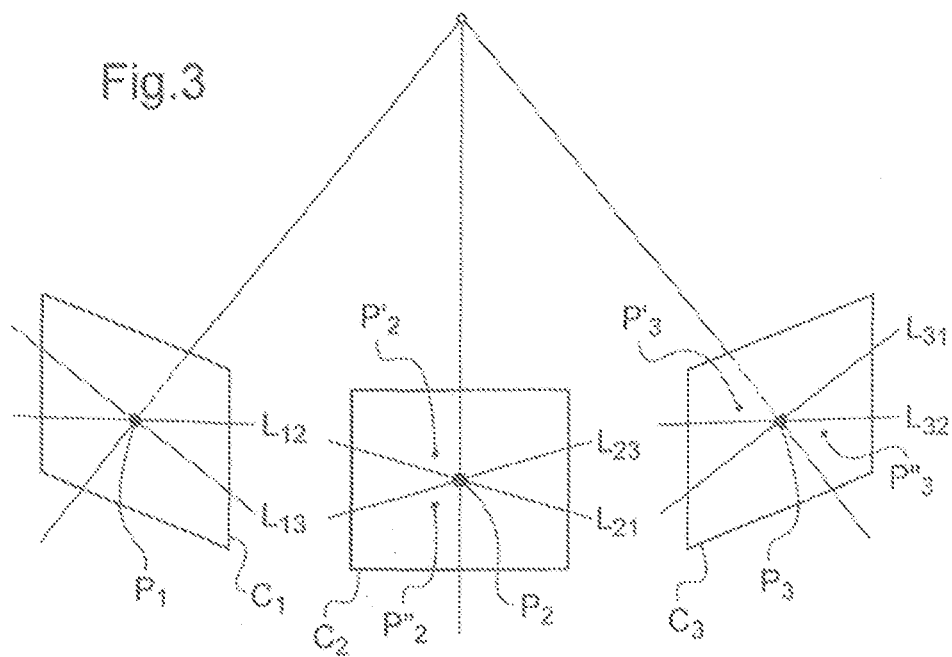
FIG. 3 is a diagram illustrating the focal planes of three asynchronous sensors observing one and the same scene according to the invention.
Figure 4:
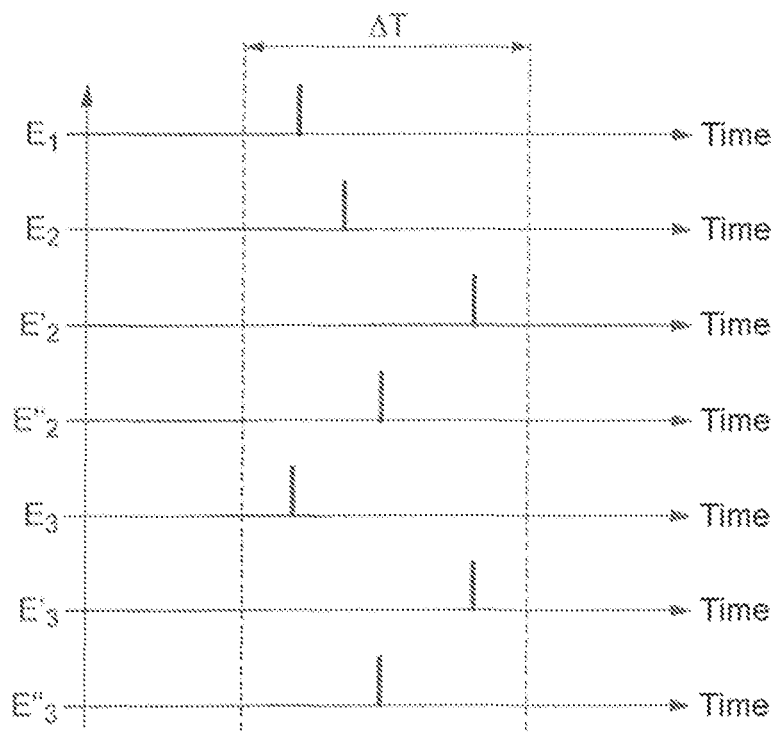
FIG. 4 is a timing diagram of events detected by the sensors in FIG. 3.

According to a particularly advantageous embodiment, at least three sensors are used to observe the same scene, as illustrated in FIG. 3. The following explanation relates to the use of three sensors $C_1$, $C_2$, $C_3$ but is easily generalized to more than three sensors.

The use of at least three sensors allows a fine discrimination of events. To do this it is necessary to know the fundamental matrices $F_{AB}$, $F_{AC}$, $F_{BC}$ linking each pair of sensors.

The implementation of the temporal selection, as mentioned beforehand, makes it possible to retain a certain number of events generated by each of the sensors and likely to correspond to the same point of the scene.

For example here, for the event $E_1$ of pixel $P_1$ in the plane of $C_1$, the events $E_2, E'_2, E''_2$ of the respective pixels $P_2$, $P'_2$, $P''_2$ have been selected in the plane of $C_2$, and the events $E_3, E'_3, E''_3$ of the respective pixels $P_3$, $P'_3$, $P''_3$ have been selected in the plane $C_3$.

To determine which of the events $E_2$, $E'_2$, $E''_2$ and $E_3$, $E'_3$, $E''_3$ correspond to the event $E_1$, it suffices to determine in the plane of $C_1$ the epipolar lines corresponding to each of these events in the plane of $C_1$, using the fundamental matrices. The pixel $P_1$ corresponding to the event is then at the intersection of two epipolar lines (here lines $L_{12}$ and $L_{13}$) generated by two events (here events $E_2$ and $E_3$ of pixels $P_2$ and $P_3$).

Reciprocally, it is observed that the pixel $P_2$ is at the intersection of the epipolar lines $L_{23}$ and $L_{21}$ generated by the events $E_1$ and $E_3$ in the plane of $C_2$, and that the pixel $P_3$ is at the intersection of the epipolar lines $L_{31}$ and $L_{32}$ generated by the events $E_1$ and $E_2$ in the plane of $C_3$. This property makes it possible to determine very quickly which of the temporally selected events must be matched.

The invention is of course not limited to that which has been described, but on the contrary encompasses any variant falling within the context defined by the claims.

To implement the matching procedure, these described sifting procedures may be applied in the order indicated, or in another order. Other sifting can of course be carried out, as long as temporally close events are matched together.

It is of course possible to use other sensors than conventional cameras, the signal of which is processed to deliver events relating to modifications in luminous intensity received by the pixels. It is for example possible to use sensors such as those described in the article "A 128×128 120 dB 15 µs latency asynchronous temporal contrast vision sensor", P. Lichtsteiner, C. Posch, T. Delbruck, IEEE Journal of Solid State Circuits, Vol. 43, No 2, Feb. 2008. This type of sensor includes receivers which, in an independent and continuous manner, quantify relative changes in luminous intensity to generate events. The sensor delivers by design an asynchronous stream of events and is perfectly adapted to the method of the invention.

Although in the example described the signal perceived by the receivers of the sensors is a luminous intensity, it is of course possible to use sensors sensitive to other signals originating from the scene, such as for example infrared radiation, sonic intensity, a radar echo, etc.

Although the modification of the signal perceived by the elementary receivers is here quantified in a basic way (a first value for an increase in the signal, and a second value for a decrease in the signal), it is of course possible to quantify these modifications in a more elaborate way, for example by gray or color levels or by levels of luminous intensity, at the cost of a modest increase in the memory size of the event indicator.

Of course, the elementary receivers can be true receivers, arranged to form together a sensor, the visual field of which includes as many pixels as there are elementary receivers. However, the elementary receivers can be virtually created by computationally isolating elementary regions of the surface of the sensor sensitive to said signal, for each of which a modification of a physical characteristic of the signal received in said region is detected, and by generating as many signals as there are individual regions. In particular, if the set of receivers form one and the same sensor, they can assume any geometry, not necessarily planar. For example, the set of receivers can be arranged in a sphere. In such geometries, the epipolar line linked to an event detected by another sensor will more generally take the shape of a geodesic.

Of course, the method of the invention applies to a mobile scene with fixed sensors just as well as to a fixed scene with mobile sensors, vibrating sensors for example.

Finally, the method of the invention can immediately be generalized to the use of more than two asynchronous sensors.

The invention claimed is:

1. A method of 3D reconstruction of a scene, including:
    the implementation of at least two sensors ($C_1, C_2$) each including a series of elementary receivers arranged to observe the scene from separate respective solid angles and which are each sensitive to a physical characteristic of a signal received by said receiver originating from the scene;
    said sensors being each adapted to emit an asynchronous stream of events ($E_i$) that are each indicative of a modification of the signal received by one of the elementary receivers at a given instant;
    the implementation of a 3D reconstruction algorithm including:
    matching elementary receivers of each of the sensors employing signals generated by the sensors, said matching including matching events generated by receivers of each sensors that relates to one and the same pattern of the scene;
    determining by triangulation the position of the point of the scene corresponding to that pattern of the scene that has been seen by the two receivers which generated the selected events, for integrating it in to the 3D reconstruction of the scene;
    characterized in that the matching step includes:
    performing a preliminary selection of temporally close events by retaining, for one given source event generated by one of the sensors, a set of events generated by the other sensor which have occurred in a given time window ($\Delta T$) around the instant of occurrence of the source event;
    if the preliminary selection retains several events generated by the other sensor, filtering these events and retaining only the one that corresponds to the source event, by applying a sifting procedure.

2. The method as claimed in claim 1, wherein each event comprises the following data:
    data making it possible to identify the elementary receiver having generated the event;
    an indicator of the modification of the signal perceived by said elementary receiver and taking at least a first value if the signal received by the elementary receiver has increased, and a second value if it has decreased;
    the instant of occurrence of the modification of the signal.

3. The method as claimed in claim 2, wherein the sensors have a focal plane, and wherein the sifting procedure comprises:
    for each selected event, computing a distance between a point of the focal plane of the second sensor corresponding to the elementary receiver having generated said selected event and an epipolar line in said focal plane associated with the elementary receiver of the first sensor having generated the source event, and eliminating all the selected events for which the distance thus determined is above a given limit D.

4. The method as claimed in claim 2, wherein the sifting procedure comprises eliminating all the selected events the indicator of which does not have the same value as the source event.

5. The method as claimed in claim 2, wherein the sifting procedure comprises eliminating all the selected events having already been the subject of a matching.

6. The method as claimed in claim 1, wherein at least three asynchronous sensors ($C_1, C_2, C_3$) are implemented then, after temporal selection, an event generated by each of the sensors is retained in such a way that each of said retained events is found at the intersection of the epipolar lines generated by the other retained events in the corresponding focal plane.

7. The method as claimed in claim 1, wherein the sensors comprise cameras of CCD or CMOS type combined with post-processing adapted to generate the asynchronous stream.

8. The method as claimed in claim 1, wherein the sensors are of the type including receivers which, in an independent and continuous way, quantify relative changes in luminous intensity to generate events, in such a way as to deliver an asynchronous stream of events.

* * * * *